United States Patent
Guttman et al.

(10) Patent No.: US 7,296,219 B1
(45) Date of Patent: Nov. 13, 2007

(54) CLIENT SIDE, WEB-BASED CALCULATOR

(75) Inventors: Steve Guttman, Oakland, CA (US); Joseph Ternasky, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 09/714,683

(22) Filed: Nov. 15, 2000

Related U.S. Application Data

(60) Provisional application No. 60/241,083, filed on Oct. 16, 2000.

(51) Int. Cl.
*G06F 17/00* (2006.01)

(52) U.S. Cl. .................. 715/503; 715/504; 715/505

(58) Field of Classification Search ............ 715/501.1, 715/503, 504, 505, 517, 526
See application file for complete search history.

(56) References Cited

U.S. PATENT DOCUMENTS

| | | | |
|---|---|---|---|
| 5,893,123 A | | 4/1999 | Tuinenga |
| 5,926,822 A | | 7/1999 | Garman |
| 6,064,982 A | * | 5/2000 | Puri ........................... 705/27 |
| 6,195,794 B1 | * | 2/2001 | Buxton ........................ 717/108 |
| 6,199,078 B1 | * | 3/2001 | Brittan et al. ................ 715/503 |
| 6,260,044 B1 | * | 7/2001 | Nagral et al. ................ 707/102 |
| 6,275,854 B1 | * | 8/2001 | Himmel et al. .............. 709/224 |
| 6,317,782 B1 | * | 11/2001 | Himmel et al. .............. 709/218 |
| 6,341,292 B1 | | 1/2002 | Cho et al. |
| 6,356,924 B2 | * | 3/2002 | Mullen-Schultz ............ 715/539 |
| 6,379,251 B1 | * | 4/2002 | Auxier et al. ................. 463/42 |
| 6,438,545 B1 | * | 8/2002 | Beauregard et al. ........... 707/6 |
| 6,473,738 B1 | | 10/2002 | Garrett |
| 6,493,733 B1 | * | 12/2002 | Pollack et al. ............... 715/513 |
| 6,510,417 B1 | * | 1/2003 | Woods et al. ................ 704/275 |
| 6,510,461 B1 | * | 1/2003 | Nielsen ....................... 709/224 |
| 6,553,363 B1 | * | 4/2003 | Hoffman ........................ 707/1 |
| 6,631,497 B1 | | 10/2003 | Jamshidi et al. |
| 6,632,249 B2 | | 10/2003 | Pollock |
| 6,654,784 B1 | * | 11/2003 | Wei ............................ 709/203 |
| 6,658,662 B1 | * | 12/2003 | Nielsen ....................... 725/109 |
| 6,687,734 B1 | * | 2/2004 | Sellink et al. ............... 709/203 |
| 2003/0058277 A1 | * | 3/2003 | Bowman-Amuah ......... 345/765 |

OTHER PUBLICATIONS

Chester et al., Mastering Excel 97, published in 1997 by SYBEX inc., Fourth Edition, pp. 34, 35, 58, 113, 125, 126, 294, 331, 961.*

(Continued)

*Primary Examiner*—Stephen Hong
*Assistant Examiner*—Gregory J. Vaughn
(74) *Attorney, Agent, or Firm*—Fredrik Mollborn

(57) ABSTRACT

A method and data structure that allows a user to view a spreadsheet in a "calculator" mode, wherein certain cells are non-editable. The calculator designer/creator can alter the default as to which cells are editable when the calculator is displayed in the calculator preview mode. Once the designer/creator made all modifications in the calculator preview mode, the user can change the cell values in the calculator mode based on the adjustments made in the calculator preview mode. The invention further allows the user to embed the calculator in any web page, to email a link to the calculator, and to open and save the calculator.

31 Claims, 14 Drawing Sheets

OTHER PUBLICATIONS

Courter et al., Mastering Microsoft Office 2000 Professional Edition, published in 1999 by SYBEX Inc., p. 183.*
Chester et al., Mastering Excel 97, published in 1997 by SYBEX inc., Fourth Edition, pp. 15, 86, 595, 600.*
Courter et al., Mastering Microsoft Office 2000 Professional Edition, published in 1999 by SYBEX Inc., pp. 1058-1059.*
*About Us Factsheet*; [online] retrieved from www.thinkfree.com (Feb. 19, 2001).
*ThinkFree Office*; [online] retrieved from www.thinkfree.com (Feb. 19, 2001).
*iReporting for eBusiness—Formula One iReporting Platform—Tidestone Technologies*; [online] retrieved from www.tidestone.com (Feb. 19, 2001).
*Tidestone Technologies—What is iReporting?*; [online] retrieved from www.tidestone.com (Feb. 19, 2001).
Hallberg et al., "Using Microsoft Excel 97," 1997, pp. 596-601.
Shadoff, "JavaScript Spreadsheet," 1997, text and source code downloaded from http://www.websorcerer.com/h12/h12.html.
Flanagan, "JavaScript, The Definitive Guide, 3rd Edition," O'Reilly 1999, pp. 244-246.
The-Ciba.com web pages [online]. The Ciba.com [retrieved Feb. 26, 2001]. Retrieved from the Internet: <URL: http://www.theciba.com/> 1 page, Building Windows Applications from Spreadsheets.
Tidestone.com [retrieved Feb. 26, 2001]. Retrieved from the Internet <URS: http://www/tidestone.com/<3 pages, Press Releases and Announcements.
The-Ciba.com web pages [online]. The ciba.com [retrieved Feb. 26, 2001]. Retrieved from the Internet: <URL: http://www.theciba.com/> 6 pages, What is Visual Baler.
DevX.com web pages [online]. DevX.com [retrieved Feb. 26, 2001]. Retrieved from the Internet: <URL: http://www.devx.com/> 3 pages, Formula One for Java 5.5.
Harvey, S., Excel 2000 for Windows for Dummies. Copyright 1999.
Screen Print of Help Menu of Microsoft Excel 2000 Hyperlink pages [captured Oct. 29, 2000] 3 pages.
Formula One for Java from Tidestone Technologies, [online]. copyright 2000 [retrieved on Oct. 30, 2000]. Retrieved from the Internet: <URL: http://www.tidestone.com/home/default.jsp> 1 page.
Tidestone Technologies, Inc., Case Studies and Customers [online]. [retrieved on Oct. 30, 2000]. Retrieved from the Internet: <URL: http://www.tidestone.com/info/casestudies.jsp> 1 page.
Tidestone Technologies, Inc., Case Study: State Street Corporation [online]. [retrieved on Oct. 30, 2000]. Retrieved from the Internet: <URL: http://www.tidestone.com/info/statest.jsp> 3 pages.
Tidestone Technologies, Inc., Product Family Overview [online]. [retrieved on Oct. 30, 2000]. Retrieved from the Internet: <URL: http://www.tidestone.com/products/default.jsp> 1 page.
Tidestone Technologies, Inc., About the Formula One for Java 8.0 Demo [online]. [retrieved on Oct. 30, 2000]. Retrieved from the Internet: <URL: http://www.tidestone.com/demos_fl/about.jsp> 2 pages.
Tidestone Technologies, Inc., About Tidestone Technologies, Inc. [online]. [retrieved on Oct. 30, 2000]. Retrieved from the Internet: <URL: http://www.tidestone.com/info/default.jsp> 2 pages.
Tidestone Technologies, Inc, Press Release [online]. [retrieved on Feb. 26, 2001]. Retrieved from the Internet: <URL: http://www.tidestone.com/info/dec898.jsp> 2 pages.
Tidestone Technologies, Inc, Press Release [online]. [retrieved on Feb. 26, 2001]. Retrieved from the Internet: <URL: http://www.tidestone.com/info/dec898a.jsp> 2 pages.
Tidestone Technologies, Inc, How to Contact Tidestone Technologies [online]. [retrieved on Feb. 26, 2001]. Retrieved from the Internet: <URL: http://www.tidestone.com/info/contact_default.jsp> 1 page.
Tidestone Technologies, Inc, Press Release [online]. [retrieved on Feb. 26, 2001]. Retrieved from the Internet: <URL: http://www.tidestone.com/info/dec198.jsp> 3 pages.
ThinkFree Office [online]. [retrieved on Feb. 26, 2001]. Retrieved from the Internet: <URL: http://www.thinkfree.com/landing.jsp> 1 page.
Find Out More, ThinkFree Office [online]. [retrieved on Feb. 26, 2001]. Retrieved from the Internet: <URL: http://www.thinkfree.com/find_out_more/find_general.html> 1 page.
"AlphaBlox SpreadsheetBlox, Turning Reports into Personalized, Interactive Applications," © 2000 AlphaBlox Corporation, SPREADSHEET-DS-0900. 2 pages.
"Inside the Analysis Suite, A Technical Architecture Overview of AlphaBlox Analysis Suite," An AlphaBlox Technical White Paper, © 1999. 33 pages.
Office 2000 White Paper: Browser Compatibility [online] Date Published: Sep. 1, 1999 [retrieved on Apr. 10, 2006] Retrieved from the Internet: <Downloaded from: URL: http:://www.microsoft.com/downloads/details.aspx?FamilyID=CDIBB908-B3F0-4921-815A-DEE8B1A98129&DisplayLang=en>. 22 pages.
Office 2000 White Paper: Web Components [online] Date Published: Aug. 16, 1999 [retrieved on Apr. 10, 2006] Retrieved from the Internet: <Downloaded from: URL: http:://www.microsoft.com/downloads/details.aspx?FamilyID=de47cb3e-4c99-4d67-85f6-a26037ddb3ab&displaylang=en>. 19 pages.
Jo Bruce, "Creating Web pages with Office 97," [online] Jul. 2000 [retrieved on Apr. 10, 2006] Retrieved from the Internet: <URL: http:://www.uea.ac.uk/sdto/web/web08.pdf>. 22 pages.
Paul Winsberg, "Dynamic Application Assembly", [online]. Oct. 1997 [retrieved on Oct. 15, 2006]. Retrieved from the Internet: <URL: http://web.archive.org/web/19980505133333/www.alphablox.com/index1.html>. 21 pages.
"AlphaBlox Enlighten, A complete system for immediate access to enterprise information and delivery of customizable Web-based Analytical Applications", [online]. © 1997 AlphaBlox Corporation [retrieved on Oct. 15, 2006]. Retrieved from the Internet: <URL: http://web.archive.org/web/19980505133333/www.alphablox.com/index1.html>. 19 pages.

* cited by examiner

FIG. 1

*(Spreadsheet screenshot - "the ultimate holiday dinner - Blox.com BrainMatter Spreadsheet")*

Formula bar (B13): `IF($E$7="Traditional",1.25*(B3-B5),IF($E$7="Alternate",(B3-B5),IF($E$7="Economy",(B3-B5)*2,"")))`

| | A | B | C | D | E |
|---|---|---|---|---|---|
| 1 | Make the Ultimate Holiday Dinner ~104 | | | | |
| 2 | | | | | |
| 3 | How many total guests are you having? | 12 ~106 | | | |
| 4 | | | | | |
| 5 | How many vegetarians? | 2 ~108 | | | |
| 6 | | | | | |
| 7 | Traditional Holiday Dinner, or something a little more unusual? | Traditional ~110 | | | |
|   | (Traditional, Alternate or Economy) | | | | |
| 8 | | | | | |
| 9 | Here's what you can whip up in your kitchen: | | | | |
| 10 | | | | | |
| 11 | A traditional Holiday Feast | | ~111 | | |
| 12 | | | | | |
| 13 | Roast Turkey | 12.5 pounds | | | |
| 14 | Bread Stuffing | 12 cups | | | |
| 15 | Soup | 12 cups | | | |
| 16 | - try a simple corn chowder or spicy bean soup | | | | |
| 17 | Side of Vegetables | 12 cups | | | |
| 18 | - try green beans, squash, or a vegetable medley as well | | | | |
| 19 | Side of Potatoes | 6 pounds | | | |
| 20 | - there's more than one way to cook a potato! Try scalloped, mashed, twice-baked, or even au gratin! | | | | |

(~102 label points to title bar; ~100 label points to window; ~112 brace groups rows 13-19)

Make the Ultimate Holiday Dinner

How many total guests are you having? [12] ~ 106

How many vegetarians? [2] ~ 108

Traditional Holiday Dinner, or something a little more unusual? [Traditional ■] ~ 110
(Traditional, Alternate or Economy)

Here's what you can whip up in your kitchen:

A traditional Holiday Feast

| | |
|---|---|
| Roast Turkey ——— 304 | 12.5 pounds ~ 111 |
| Bread Stuffing | 12 cups |
| Soup | 12 cups |
| - try a simple corn chowder or spicy bean soup | |
| Side of Vegetables | 12 cups |
| - try green beans, squash, or a vegetable medley as well | |
| Side of Potatoes | 6 pounds |
| - there's more than one way to cook a potato! Try scalloped, mashed, twice-baked, or even au gratin! | |
| Pumpkin Pie | 2 pies |
| - or try something different, like a Sweet Potato Pie! | |
| Hot Apple Cider | 24 cups |

FIG. 2

Make the Ultimate Holiday Dinner

How many total guests are you having? [ 12 ] — 106

How many vegetarians? [ 2 ] — 108

Traditional Holiday Dinner, or something a little more unusual? [ Traditional ▼ ] — 110
(Traditional, Alternate or Economy)   302

Here's what you can whip up in your kitchen:

A traditional Holiday Feast                            304  111

Roast Turkey                                           [ 12.5 ] pounds
Bread Stuffing                                         [ 12 ] cups
Soup                                                   [ 12 ] cups
- try a simple corn chowder or spicy bean soup
Side of Vegetables                                     [ 12 ] cups
- try green beans, squash, or a vegetable medley as well
Side of Potatoes                                       [ 6 ] pounds
- there's more than one way to cook a potato! Try scalloped,
mashed, twice-baked, or even au gratin!
Pumpkin Pie                                            [ 2 ] pies
- or try something different, like a Sweet Potato Pie!
Hot Apple Cider                                        [ 24 ] cups

*fig 3*

CLIENT SIDE, WEB-BASED CALCULATOR

This application claims priority under 35 U.S.C. §119(e) to U.S. Provisional Ser. No. 60/241,083, of Guttman and Ternasky, filed Oct. 16, 2000, which is herein incorporated by reference.

This application is related to U.S. application Ser. No. 09/714,024, of Guttman and Ternasky, filed Nov. 15, 2000, entitled "Client Side, Web-Based Spreadsheet," which is herein incorporated by reference.

BACKGROUND OF THE INVENTION

The present invention relates generally to dynamic hyper-text markup language (HTML) web pages and, more specifically, to a method for creating and viewing a calculator web page that has selectively viewable components.

Currently, web pages are defined using Hyper-Text Markup Language (HTML). Most web pages are passive. Specifically, a user just reads web pages and occasionally fills in a field of a form, submits the form to a server, and waits for a reply. In general, most users are not sophisticated consumers. Therefore, users want web-based programs to be fool-proof and easy to use. That is, web users want web-based programs to be designed so that the user cannot somehow damage the program or data by entering incorrect data or by clicking on a wrong area of the displayed web page.

SUMMARY OF THE INVENTION

Active applications written in Dynamic HTML combine the look of a traditional desktop application with the facilities of the World Wide Web (WWW). When the user is working with a spreadsheet written in Dynamic HTML, the user can create formulas, add and delete columns, and format cells. At the same time, the user has a disadvantage of mistakenly changing content of any particular cell because each cell in a spreadsheet is editable. Thus, there is a need for a method and system that will allow working with a web-based spreadsheet so that the user is unable to change the content of any cell by mistake.

A described embodiment of the present invention allows a designer/creator to create and view "calculator" web pages. A calculator web page is a special version of a spreadsheet web page. When a user is working with a spreadsheet, it is unfortunately easy for him to mistakenly change the content of a particular cell because each cell in a spreadsheet is editable. The described embodiment of the present invention allows the user to view a spreadsheet as a calculator so that the user can work with a fill-in-the-blanks, standalone application. The user can just enter his data and view the calculator results. The user cannot change the content of any cell by mistakenly clicking on that cell. By default, the calculator uses a described method to determine which spreadsheet cells are initially editable in the calculator.

Another advantage of the described embodiment of the present invention is that in order for the user to work with a calculator, no other special software is involved, except for a web browser. The present invention serves as a design tool for the calculator designer because it produces interactive HTML pages without requiring the designer to be familiar with the web programming. In accordance with the purpose of the present invention, as embodied and broadly described herein, the invention is a computer-implemented method for viewing a web-based spreadsheet in a calculator mode. The method comprises sending a request, by a user, to view the calculator web page; displaying the requested calculator web page, wherein only certain cells in the calculator are editable; and allowing the user to change contents in editable cells, but not allowing the user to change contents in non-editable cells.

In further accordance with the purpose of the invention, as embodied and broadly described herein, the invention is a computer-implemented method performed by a server data processing system. The method comprises receiving a request, from a client, for a calculator web page; reviewing parameters received with the request for the calculator web page, said parameters include a calculator mode and a data ID; sending the requested calculator web page, to the client, based on the parameters received, wherein said calculator web page contains embedded data specific to the requested calculator web page and wherein the calculator web page displays a calculator having only certain cells that are editable.

In further accordance with the purpose of the invention, as embodied and broadly described herein, the invention is a data structure comprising a member file for keeping information about members, a spreadsheet/calculator data file for keeping spreadsheet and calculator information on a server, and a Data Array file for keeping spreadsheet and calculator information on a client.

In further accordance with the purpose of the invention, as embodied and broadly described herein, the invention is a method for building a calculator, the method comprising determining a number of rows and columns for the calculator; initializing the content of each cell in the calculator; making the cells visible once all the cells are built; and performing calculations for cells having formulas in them.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 pictorially illustrates a web-based spreadsheet in a spreadsheet mode in accordance with a described embodiment of the present invention.

FIG. 2 illustrates a web-based calculator created using calculator preview mode in accordance with a described embodiment of the present invention.

FIG. 3 pictorially illustrates adjusting editability of cells in the calculator of FIG. 2 using calculator preview mode in accordance with a described embodiment of the present invention.

DETAILED DESCRIPTION OF ILLUSTRATED EMBODIMENTS

Figure 4:
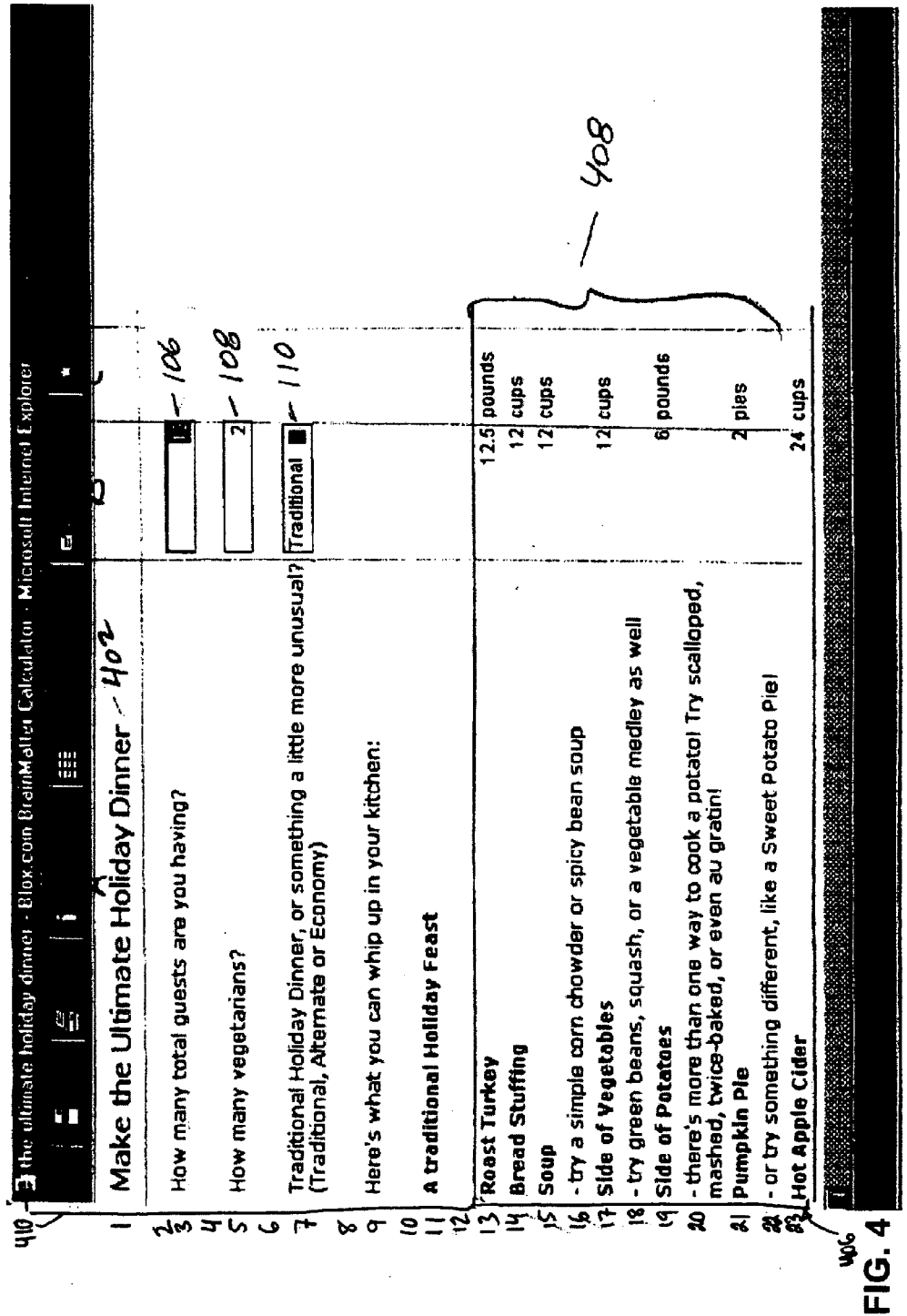
FIG. 4 pictorially illustrates the spreadsheet of FIG. 1 during use in a calculator mode in accordance with a described embodiment of the present invention.

Reference will now be made in detail to several embodiments of the present invention, examples of which are illustrated in the accompanying drawings. Wherever practicable, the same reference numbers will be used throughout the drawings to refer to the same or like parts.

A described embodiment of the present invention allows a user to view a web-based spreadsheet as a calculator, wherein only certain cells of the calculator are editable. The designer/creator of the web-based spreadsheet allows the user to alter the default as to which cells are editable when the calculator is displayed in a calculator preview mode. The described embodiment further allows the user to change the cells' content in the calculator mode based on the adjustments made in the calculator preview.

FIG. 1 illustrates a web-based spreadsheet in a spreadsheet mode. The spreadsheet 100 contains columns and rows where all the spreadsheet calculations are performed. Each row has a number and each column has a letter. A cell is the intersection of a row and a column and is referenced with a Column letter Row number notation, such as A1 or C3. The example spreadsheet 100 has at least 20 rows (numbered 1 through 20) and 5 columns (labeled A through E). The user can reset the number of rows and columns in the spreadsheet with the "Set Size" command. In addition, the user can add or delete columns with the "Insert/Delete Rows or Columns" commands. A cell can contain labels, numbers, text (strings), dates/times, or formulas. Other embodiments may have additional types of data in their cells. A string is a text entry, such as, "Make the Ultimate Holiday Dinner," as displayed in cell A1 (104). A number is an integer or decimal value, which can be formatted as currency, integers (whole numbers), decimal numbers, or percentages. Users can define arbitrary formats.

The user can change information for any specific cell in the spreadsheet. To do so, the user has to click on that cell to highlight it. The command line 102 is the area of the spreadsheet where a user enters and edits cell values and formulas. To change information for a specific cell, a user clicks on that cell to highlight it. Then, the user can type the value, text or formula for that cell into the command line field. In the illustrated spreadsheet 100 the user entered the number "12" into the command line for cell B3 (106) and "2" for cell B5 (108). Also, the user chose a "traditional" dinner in cell 110 over "economy" or "alternate" dinner. If the user wants to change the type of meal he is planning (for example, the user wants to type "Corn Beef" instead of "Roast Turkey"), the user just needs to click on that cell to highlight it and enter "Corn Beef" into the command line. In the example spreadsheet, cell 111 has the following associated formula, as displayed in the command line 102: =IF($B$7="Traditional",1.25*(B3–B5),IF($B$7="Alternate", (B3–B5),IF($B$7="Economy",(B3–B5)*2," "))). Thus, if cell B7 contains "Traditional," a value of 12.5 is displayed in cell B13 (111), (as shown). This value is derived from the formula 1.25(B3–B5), wherein B3=12 and B5=2. Different values of cell B7 cause other values to be displayed in cell B13 (111). Cells 112 also have formulas associated with them. Working with a spreadsheet allows a user to customize the spreadsheet for whatever purpose the user desires. When a user is working with a spreadsheet, however, it is easy for him to mistakenly change content or formulas of a particular cell because each cell in a spreadsheet is editable.

FIG. 2 illustrates a web-based calculator created using calculator preview mode in accordance with a described embodiment of the present invention. Any spreadsheet can be viewed in either spreadsheet mode, calculator mode, or calculator preview mode. The drop-down "Calculator Preview" command, which is accessed from the spreadsheet mode, lets a designer/creator adjust which cells may be "filled-in" (edited) when the spreadsheet is viewed as a calculator. Viewing the spreadsheet in a spreadsheet mode, as illustrated in FIG. 1, allows a user to customize the spreadsheet for any purpose the user wishes. To pre-view the spreadsheet as a calculator, the user has to select the "Calculator Preview" command from the Tools menu. As shown in FIG. 2, the Menu Bar, Format Bar and Command Line will disappear. In place of the Format Bar an "Exit Preview" button (202) will appear. The spreadsheet grid is also hidden, and all cells that may be edited by a user of the calculator (106, 108, and 110) have a blue outline (or similar indication) around them.

By default, the system will take its best guess at which cells should be editable when the spreadsheet is displayed in a calculator preview mode. Cells that depend on values in other cells (for example, a cell with an associated formula (111)) default to non-editable. Cells with values that other cells depend on (106, 108, and 110) (but which don't have formulas in them) default to editable. Cells that do not depend on values in other cells default to non-editable.

FIG. 3 illustrates the process of allowing a designer/creator to adjust editability of cells in the spreadsheet of FIG. 1 using the calculator preview mode in accordance with a described embodiment of the present invention. As was illustrated in FIG. 2, by default, the system will take its best guess at which cells should be editable when the spreadsheet is initially displayed in calculator preview mode. Each Data Array file 502 and Spreadsheet/Calculator Data file 516 (as will be discussed with reference to FIG. 5) includes editability flags for each cell, which is assigned a "FALSE" or "TRUE" logic value. This value indicates whether a certain cell is editable or not. If the cell has a "TRUE" value, it is locked, and a user cannot edit that cell in the displayed calculator, in the calculator mode. Alternatively, if the cell has a "FALSE" value, it is unlocked, and a user of the displayed calculator can edit that cell. Thus, for example, in the displayed calculator of FIG. 4, only cells 106, 108, and 110 are unlocked and can be changed by a user in the calculator mode.

In some cases, however, a designer of a spreadsheet/calculator may want to adjust the default editability. To do so, the calculator designer/editor needs to click on a cell in calculator preview mode to toggle it from editable to non-editable and vice versa. Once the designer/creator clicks on the cell to adjust its editability, the matching object is found in the HTML page, and the executing JavaScript changes the editability flag value from "TRUE" to "FALSE" (or vice versa). For example, as shown in FIG. 2, a user viewing the calculator could only edit the cells related to the number of guests 106, the number of vegetarians 108, and the type of meal 110. Adjusting the cells' editability allows the user to edit the descriptive text or any other cell in the calculator when the calculator is displayed to the user. Once the designer/creator adjusts editability of cells, a user can change the cells' values in a calculator mode. In particular, if the designer/creator toggles cell 304, which includes the text "Roast Turkey," in calculator preview mode the designer/creator changes its editability in the calculator preview mode so that a blue outline (or similar indication) appears around cell 304. Once in a calculator mode, the user can change the value of cell 304 by typing "Corn Beef" instead of "Roast Turkey". Similarly, toggling cell 302 in the calculator preview mode by the designer/creator allows the user to change the content of cell 302 in the calculator mode from "How many vegetarians" to "How many lacto-vegetarians." Thus, once the designer/creator has finished these modifications to editability, the user can change values of cells in the calculator mode based on the editability adjustments made in the calculator preview.

FIG. 4 illustrates an example of displaying the spreadsheet of FIG. 1 in a calculator mode in accordance with a described embodiment of the present invention. The example calculator web page 400 features a calculator displayed in calculator mode and in which only certain cells are editable. The calculator 400 allows the user to plan the Ultimate Holiday Dinner based on the number of guests and type of meal the user would like to make. The name of the calculator is displayed on the top of the page in the form of a text entry: "Make the Ultimate Holiday Dinner 1" 402. The user is prompted to enter information related to the number of total guests and the number of vegetarians among the guests 106 and 108. The user also is prompted to choose among traditional, alternate, or economy dinner 110. A number of total guests, number of vegetarians and a type of the dinner are the only editable cells in the calculator. These cells were set to be editable either by default when the spreadsheet was made or by the designer/creator in calculator preview mode.

In the bottom half of the page, the calculator displays the assortment of food that the user needs to have in order to prepare the dinner. It includes the following text entries, which are not editable: Roast Turkey, Bread Stuffing, Soup, Side of Vegetables, Side of Potatoes, Pumpkin Pie, and Hot Apple Cider 406. In the calculator 400, the user is having twelve guests (where two people are vegetarians). The user has chosen a traditional dinner (110). Once the user enters all the requested information, the calculator estimates the quantity of food that the user needs to have in his kitchen in order to accommodate the total number of invited guests. It should be noted that the cells displaying the quantity of food 408 are not editable by the user. The calculator was so-designed by its designer/creator. The calculator determines that for the traditional type of dinner the user needs to have 12.5 pounds of roast turkey, 12 cups of bread stuffing, 12 cups of soup, 12 cups of vegetables on a side, 6 pounds of potatoes on a side, 2 pumpkin pies, and 24 cups of hot apple cider. Each of these cells has an associated formula depending on one or more of cells 106, 108, 110. The example calculator web page also includes a function menu 410 located at the top of the page allowing the user to save the calculator, print the calculator, receive instructions, edit calculator as a spreadsheet, email the calculator to others, and rate the calculator. In order to email the calculator, the user should click on "email this page" button and enter a recipient's address. The system will email a URL of the calculator, including the proper parameters in the URL.

Thus, the present invention advantageously allows working with a spreadsheet that is displayed in a calculator mode so that the user cannot change the content of any cell by mistakenly clicking on that cell. The calculator designer/creator can change the system default as to which cells are editable.

Figure 5:
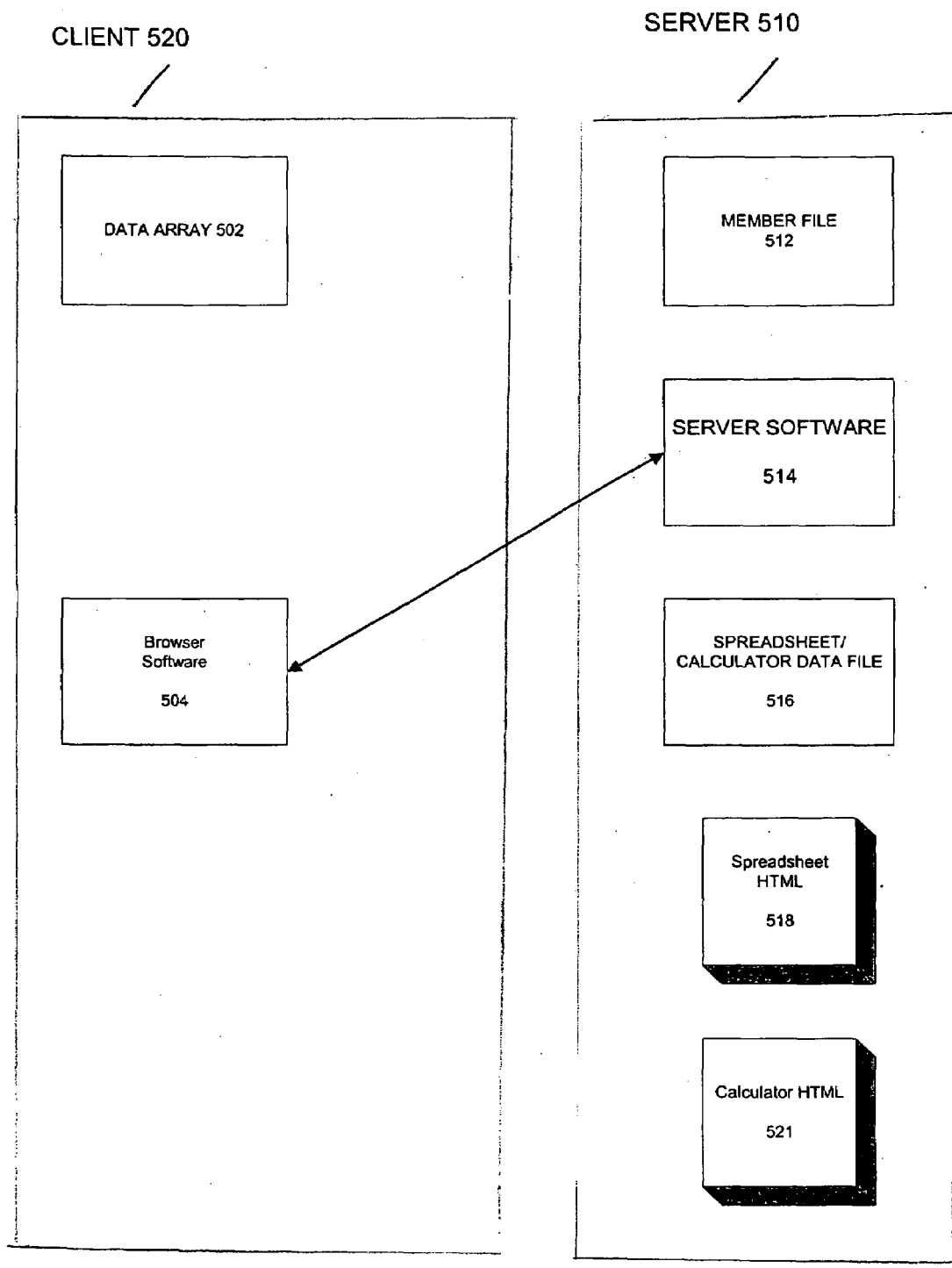
FIG. 5 is a block diagram illustrating an overall architecture in accordance with a described embodiment of the present invention.

FIG. 5 is a block diagram illustrating an overall architecture of the present invention. A server system 510 includes, but is not limited to, a Member file 512, server software 514, a Spreadsheet/Calculator data file 516, a spreadsheet HTML 518, and a calculator HTML 521. It should be understood that the architecture illustrated in FIG. 5 is shown for purposes of example only and is not to be construed in a limiting sense.

The Member file 512 includes information for all members who have an account with the system. Initially, when a user logs into the system, he is asked whether he is a member who has an account with the system (the "log in" process will be discussed in detail with reference to FIG. 11). If the user is a member, he is allowed to access the system. In the alternative, if the user is not a member, he is offered to enter his identifying information, which might include a password and email address.

The Spreadsheet/Calculator data file 516 contains information related to spreadsheets and calculators. Such information may include a data ID, which refers to a file name, and information for each individual cell of a spreadsheet/calculator. In particular, the cell information related to each individual cell includes, but is not limited to, the information related to cell dependency, formatting, content, and editability. The server software 514 manages the files and communicates with the browser. The server software 514 handles opening, saving, and incorporating live data (such as stock quotes) into the files. In addition, the server software 514 returns the HTML page 518 and calculator page 521 in response to a request received from the client system 520, via a browser 504.

The client system 520 includes browser software 504 and a Data Array 502. The user, via the browser 504, sends a request to the server 510 for an HTML page. The server software 514 reviews the parameters received with the request. If the parameters include a "spreadsheet" mode, a spreadsheet HTML page 518 is returned to the client 520. In the alternative, if the parameters include a "calculator" mode, the server 510 returns the calculator HTML page 520. If the parameters include an "embed" mode, the server returns a fully formed calculator web page. The Data Array 502 is an array of cell descriptions whose values are loadable from JavaScript in the HTML page. The Data Array 502 contains information related to each individual cell, which includes, but is not limited, to cell dependency, formatting, content, and editability. When the designer/creator saves a file, client 520 turns the definition of each cell into a string. The concatenated cell strings define the entire spreadsheet.

Client 520 sends the concatenated string to the server 510. The server 510 takes the string and writes it into the Spreadsheet/Calculator Data File 516. Thus, a client-format Data Array 502 is translated into Spreadsheet/Calculator Data File 516 in the server file format.

The browser 504 is software effecting the requesting and displaying of HTML web pages. The browser software can be standalone or integrated within other software products. It should be understood that each of clients and web servers in the described embodiment preferably includes a processor and a memory. The memory includes instructions capable of being executed by the processor to perform the functions described below. The server can also include a computer readable medium for storing the instructions. The server system 510 communicates with the client system 520 via any appropriate communication mechanism, including but not limited to, a network, an intranet, the Internet, wireless communications, telecommunications, cable modems, and satellite communications.

Figure 6A:
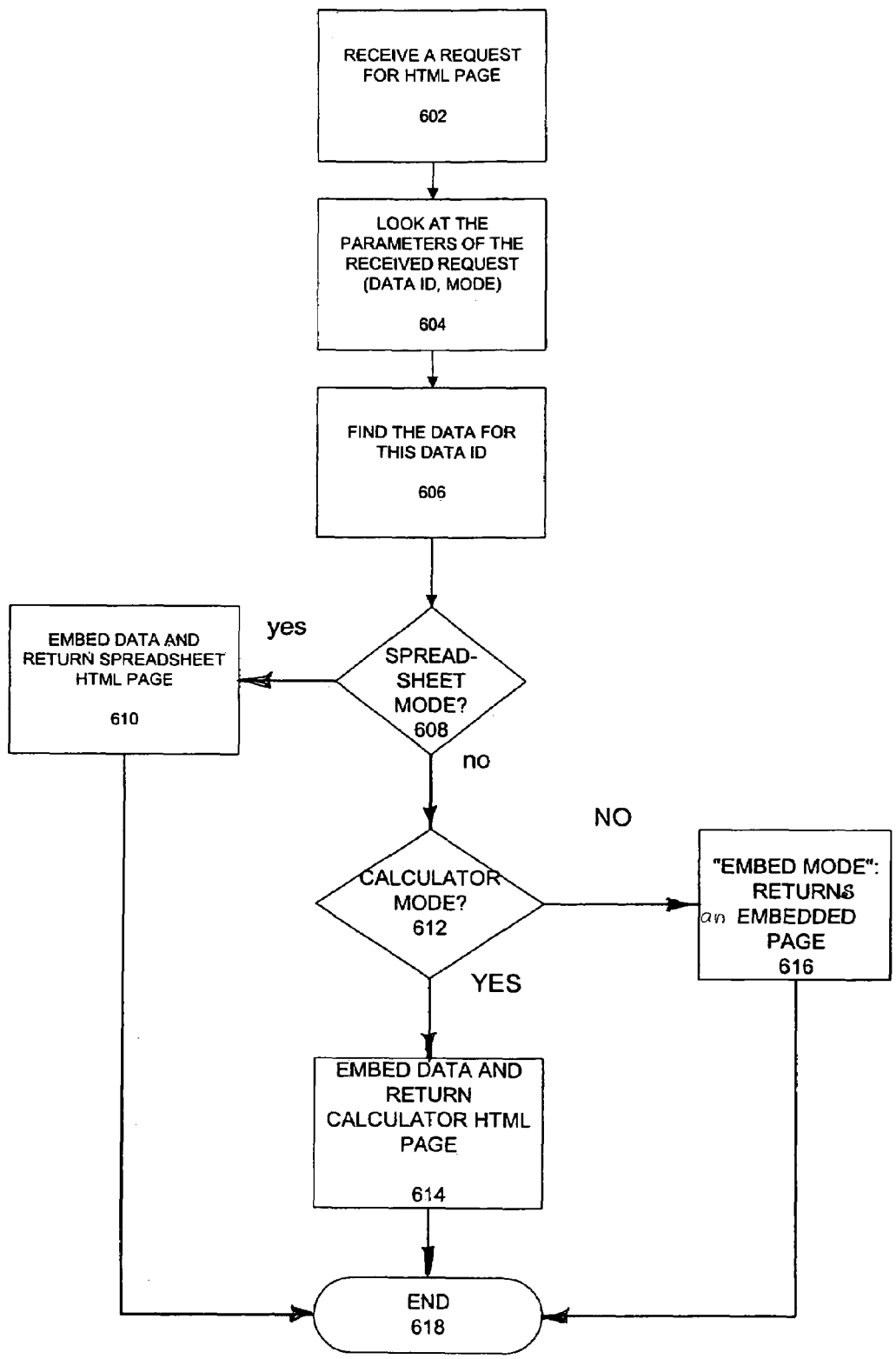
FIG. 6A is a flow chart showing the process of returning an HTML web page to the user, performed by a server, in accordance with a described embodiment of the present invention.

FIG. 6A is a flow chart showing the process of returning an HTML web page, performed by the server 510, in accordance with a described embodiment of the present invention. In element 602, the server 510 receives a request for an HTML page, from the browser 504. In element 604, the server reviews the parameters received with the request (for example, the URL parameters in Common Gateway Interface (CGI) style). The parameters may include a data ID, which refers to the file name, and a mode, which preferably is one of spreadsheet mode, calculator mode, or embed mode. The server 510 finds the data in element 606 based on the data ID parameter received. If the designer/creator requested a spreadsheet, in element 608, the server embeds data using JavaScript and returns a spreadsheet HTML web page 518 to the designer/creator in element 610. If the designer/creator requested a calculator in element 612, the server 510 returns a calculator HTML web page 521 to the designer/creator in element 614. The spreadsheet HTML 518 contains script tags, spreadsheet data, and an HTML user interface. The calculator HTML 521 contains script tags, calculator data, and an HTML user interface. For example, in the case of a calculator HTML page 521, the script tag states the following, as shown in Table 1 (Table 1 shows an example of JavaScript included within a calculator web page, and is herein incorporated by reference): href="/css/calculator_ie4_eda7fc0b.cssx", whereas a spreadsheet HTML page 518 script tag states: href="/css/spreadsheet_ie4_630ddc74.cssx". Furthermore, in the calculator HTML page 521, the user interface differs from that in a spreadsheet HTML 518. There are also some differences in JavaScript code embedded in calculator HTML page 521 and spreadsheet HTML 518. In particular, cells in a calculator HTML page 521 have different parameters than cells in a spreadsheet HTML page 518. Thus, cells in a spreadsheet are unlocked and the editability flag has a "FALSE" value, whereas most cells in a calculator are locked and the editability flag has a "TRUE" value.

If the designer/creator requested data in the Embed mode, a loaded, fully formed HTML page is returned, in element 616. This HTML page does not include HTML script tags, unlike calculator HTML 521 and spreadsheet HTML 518. The embedded HTML page dynamically returns the HTML page. This is accomplished using "JavaScript include" tags. The "JavaScript include" tags return dynamically created JavaScript reflecting the current change in the calculator or spreadsheet file. The process ends in 618 once the HTML page is returned to the designer/creator.

Figure 6B:
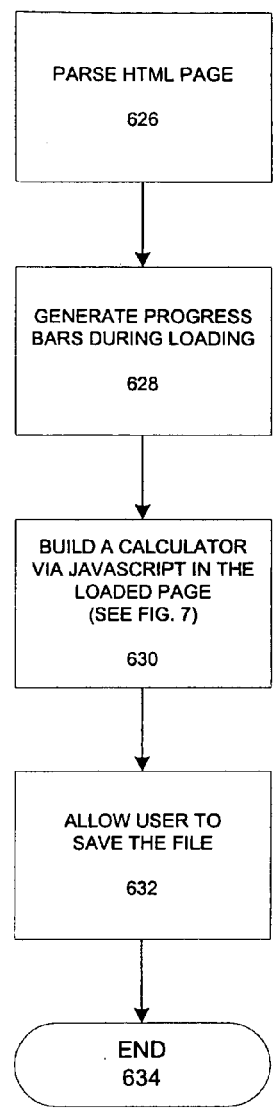
FIG. 6B is a flow chart showing the steps performed by a browser in accordance with the present invention.
Figure 7:
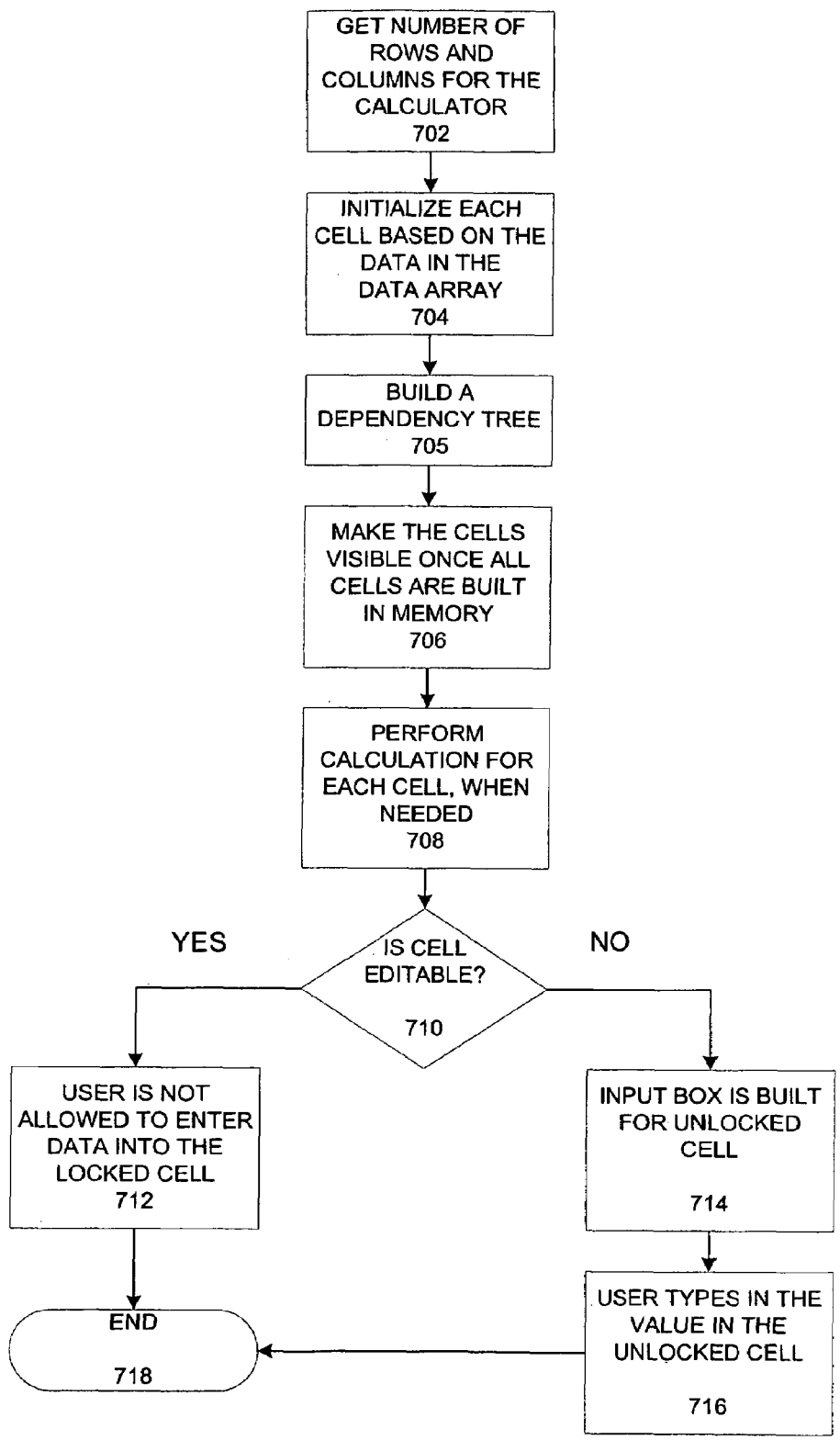
FIG. 7 is a flow chart illustrating the process of building a calculator in accordance with a described embodiment of the present invention.

FIG. 6B is a flow chart showing the steps performed by a browser 520 in accordance with the present invention. Once the browser sends a request for an HTML page, as was discussed with reference to FIG. 6A, the server reviews the parameters received with the request and returns the HTML page accordingly. The parameters received may include a Data ID, which refers to the file name, and a mode, which preferably is one of spreadsheet mode, calculator mode, or embed mode. The browser 504, in turn, receives the HTML page, parses the page written in JavaScript, and executes JavaScript code, in element 626. The HTML page may include JavaScript files specific to spreadsheets and calculators, such as "Calculator JS file" and "Spreadsheet JS file" and shared data files, which could be shared by calculators and spreadsheets. Once the browser parses the page in element 626, it might send additional requests to the server 510 for data, which was referred to in the HTML page. In element 628, loading progress bar reports are generated and displayed informing the user about the status of the progress of program execution. In particular, the progress bar may indicate the following: "Loading a Calculator" or "Loading a Spreadsheet." In element 630, the calculator is built (as shown in FIG. 7). In element 632, the user has the option of saving the file he is currently working with if the data was modified since the last time the file was saved. The process ends in element 634. Building the calculator 630 is discussed below.

FIG. 7 is a flow chart illustrating the process of building a calculator in accordance with a described embodiment of the present invention. Initially, a client system 520 receives the number of rows and columns to build a particular calculator, in element 702. For instance, as illustrated in reference with FIG. 4, an example calculator has 6 columns and 24 rows. A two-dimensional array of cell elements is built. In element 704, each cell is initialized and a dynamic HTML is specified for each cell. This step includes obtaining information about a particular cell from a Data Array file 502. This information includes, but is not limited to, cell dependency, formatting, content, and editability. Thus, as illustrated in FIG. 4, cell A3 which includes the text "HOW MANY TOTAL GUESTS ARE YOU HAVING?" is described by the following parameters, as shown in Table 1: {ENTRY:'HOW MANY TOTAL GUESTS ARE YOU HAVING?',LOCKED:'FALSE',VIEWSIZE:'9PT',FORECOLOR:'NAVY',VIEWFAMILY:'VERDANA',_WRAPTEXT:'TRUE',_TEXTALIGN:'LEFT',M_ROW:3,M_COL:1,L_NR:'HOW MANY TOTAL GUESTS ARE YOU HAVING?'}. According to these parameters, cell A3 is the intersection of a third row and a first column and is referenced with a Column # Row # notation A3. Cell A3 is an editable cell because the editability flag is set to "FALSE" (the calculator was so-designed by its designer/creator), the text in the cell is aligned to the left, the color of the cell is navy, and the size of the cell is 9pt.

Once dynamic HTML is specified for each cell, the dependency tree is built, in step 705. The dependency tree is part of the Data Array 502. Any calculator has at least two types of cells: the ones that depend on a particular cell and the ones that a particular cell depends on. Some cells in the Data Array 502 contain the field "i_rt" and others contain the field "i_tb". The fields are lists of other cells that a given cell depends on (i_rt) and a list of cells that depend on this cell (i_tb). "I_tb" stands for "initialize the referred to by cell" and "i_rt" stands for "initialize refers to cell." In the example calculator illustrated in FIG. 3, cell B13 (111) is a dependent cell. The following is the list of other cells that cell B13 depends on, as shown in Table 1: I_RT:'[E[7][2],E[3][2],E[5][2]]'. Accordingly, cell B13, which is the intersection of row 13 and column 2, depends on cells B7 (110), B3 (106), and B5 (108), where cell B7 displays the type of dinner the user selected, cell B3 displays the number of guests the user is expecting, and cell B5 displays the number of vegetarians among the guests. Thus, if cell B7 contains "Traditional," a value of 12.5 is displayed in cell B13 (111), (as shown in FIG. 3). This value is derived from the formula, which is described in the Data Array 502: 1.25*(B3−B5). If B3=12 and B5=2, the value displayed in cell B13 is 12.5. If cell B7 contains "Economy," a value of 20 is displayed in cell B13 (not shown). This value is derived from the formula described in the Data Array 502 (B3−B5)*2. If B3=12 and B5=2, the value displayed in cell B13 is 20.

Once all cells are built, they become visible, in element 706. This is done with a combination of HTML that is generated on the fly using JavaScript and by JavaScript itself. In element 708, calculations are performed for each cell, when needed. For example, if the user chooses a "traditional" dinner in cell B7, cell A13 displays a "Roast Turkey." Formula calculations are performed for cell B13 to determine how many pounds of roast turkey are required to prepare the dinner based on the number of guests. If the user chooses an "alternate" dinner in cell B7, cell A13 displays "Cornish Game Hens." Calculations are performed for cell B13 to determine how many pieces of hen are required to prepare the dinner. Similarly, if the user chooses "economy" dinner in cell B7, cell A13 displays "Chicken Parmesan." Calculations are performed for cell B13 to determine how many pieces of chicken are required to accommodate twelve guests, where two of them are vegetarians.

Once all calculations are made, the determination is made whether a particular cell is editable (whether it is locked), in element 710. If a cell is non-editable, that cell is locked and the user is not allowed to enter data into that cell in calculator mode, in element 712. For example, according to Data Array 502 description, cells A13-A23 are locked and the user cannot change their content. In the alternative, if the cell is editable (unlocked) (for example, cells B3 and B5, as described in the Data Array 502), an input box is built around that cell, in element 714. The user can type in the value in that cell because it is unlocked in calculator mode, in element 716. Thus, the user can type in "12" in cell B3 and "2" in cell B5. The process ends in 718.

Figure 8:
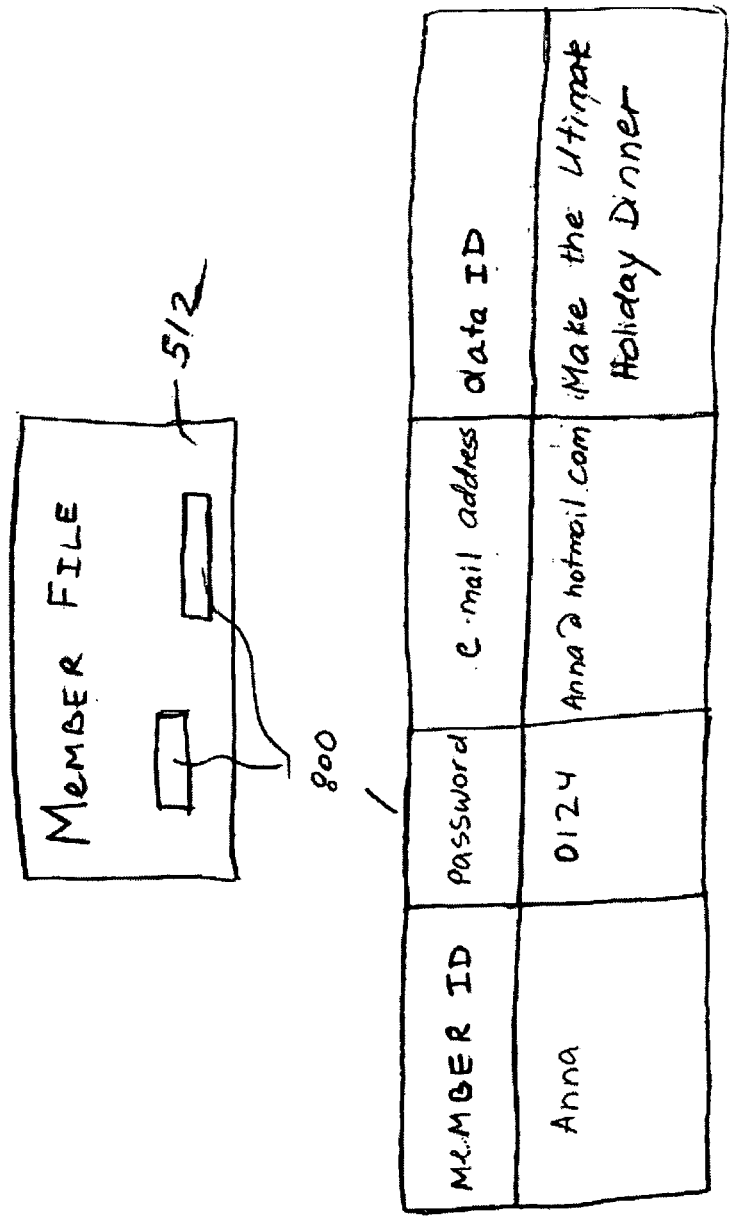
FIG. 8 is a block diagram showing an example record in a member file in accordance with a described embodiment of the present invention.

FIG. 8 is a block diagram showing a Member file 512 and an example member record 800. The Member file 512 keeps member information in the form of member records 800. The member record 800 identifies a particular member. In one embodiment of the present invention, the example member record may have the following fields: a member ID, a password, an email address, and a data ID, which refers to a file name. The example record 800 features a member ID equal to ANNA, 0124 as a password, ANNA@HOTMAIL.COM, as an email address, and "Make the Ultimate Holiday Dinner 1" as a file name. When a user initially signs up with the system, all user information is forwarded to the member file 512.

Figure 9:
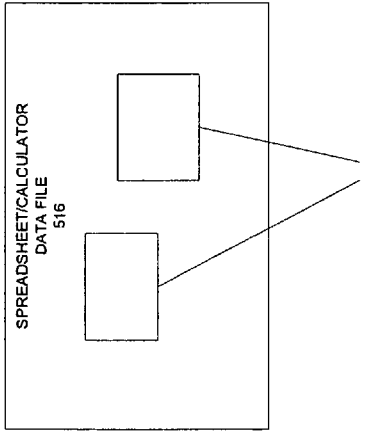
FIG. 9 is a block diagram showing an example record in a spreadsheet/calculator data file in accordance with a described embodiment of the present invention.

FIG. 9 is a block diagram showing a Spreadsheet/Calculator data file 516 and an example record 900. The Spreadsheet/Calculator data file 516 keeps spreadsheet and calculator data information. The same data file is used to generate spreadsheet HTML 518 and calculator HTML 521. In particular, it contains a user name, data ID (for example, a file name) and information about each cell. The information for every cell may include value, formula, formatting, editability, and borders. Each Data Array file 502 and Spreadsheet/Calculator Data file 516 includes an editability flag for each cell, which is assigned a "FALSE" or "TRUE" logic value. This value indicates whether a certain cell is editable or not. If the cell has a "TRUE" value, i.e., if it is locked, a user cannot edit that cell when viewing the calculator. Alternatively, if the cell has a "FALSE" value, i.e., if it is unlocked, that cell can be edited when viewing the calculator. FIG. 9 features the example record 900 having the following fields: User Name=ANNA, Data ID="Make Thanksgiving Dinner," and information about each cell. In particular, cell A3 which includes the text "HOW MANY TOTAL GUESTS ARE YOU HAVING?" is described by the following parameters, as shown in Table 1: {ENTRY:'HOW MANY TOTAL GUESTS ARE YOU HAVING?', LOCKED:'FALSE',VIEWSIZE:'9PT',FORECOLOR: 'NAVY',VIEWFAMILY: 'VERDA NA',__WRAPTEXT:'TRUE',__TEXTALIGN:'LEFT',M__ROW:3,M__COL:1,I__NR:'HOW MANY TOTAL GUESTS ARE YOU HAVING?'}. According to these parameters, cell A3 is the intersection of a third row and a first column and is referenced with a Column letter Row number notation A3. Cell A3 is an editable cell because the editability flag is set to "FALSE" (the calculator was so-designed by its designer/creator), the text in the cell is aligned to the left, the color of the cell is navy, and the size of the cell is 9pt.

Figure 10:
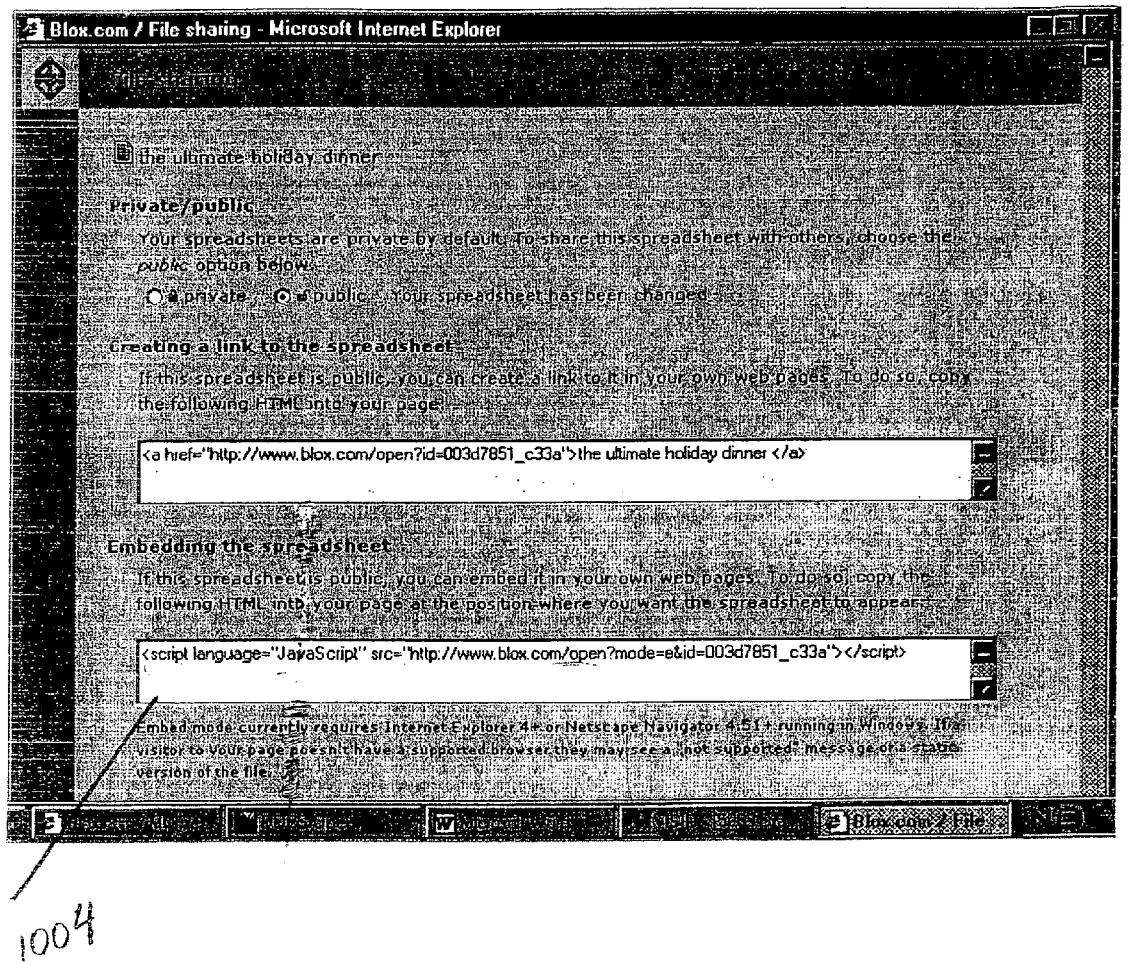
FIG. 10 pictorially illustrates a process of allowing a user to embed a calculator in any web page in accordance with a described embodiment of the present invention.

FIG. 10 illustrates a process of allowing a web page user to embed a calculator in any web page. If a user has a personal web site, he can include one of his calculators with other text and graphics directly into his web site. To embed a calculator in a web page, the user has to go to the "My Files" page (see FIG. 13). Then, the user has to highlight the file he wants to embed and select the "Sharing" command from the Action Panel on the right side of the screen. Performing this step will bring up a dialog box with the appropriate HTML code (which includes the parameters of data ID for the calculator and anchor text that will appear as a link on the page). The user has to copy this code (1004) to the clipboard and then paste the code into his web page's HTML at the location he wants the calculator to appear. In the Sharing dialog, the user first needs to set his file to Public. Embedding the calculator advantageously allows to view the calculator file within the user's own web page. When a web page designer/creator embeds a calculator on a web page, he is actually adding some code to an HTML page which calls that calculator from the server 510. When this code is downloaded to someone's web browser, the browser makes a request to the server 510 to display the calculator of interest. The server then returns the appropriate calculator and Dynamic HTML code to that web browser. As discussed above in reference to FIG. 6A, the HTML page does not include HTML script tags, unlike calculator HTML 521 and spreadsheet HTML 518. The embedded HTML page includes means to dynamically return the HTML content. These means are "JavaScript include tags." The JavaScript include tags return dynamically created JavaScript reflecting the current change in the calculator or spreadsheet file.

The embedded calculator is a fully formed calculator web page which looks identical to the calculator web page discussed in reference to FIG. 4. The example calculator web page 400 features a calculator, wherein only certain cells are editable. The calculator 400 allows the user to plan Thanksgiving dinner based on the number of guests and type of meal the user would like to make. The name of the calculator is displayed right on the top of the page in the form of a text entry: "Make the Ultimate Holiday Dinner" (402). The user is prompted to enter information related to the number of total guests and the number of vegetarians among the guests 106 and 108. Also, the user is prompted to choose among traditional, alternate, or economy dinner 110. A number of total guests, number of vegetarians and a type of the dinner are the only editable cells in the calculator.

These cells were set to be editable either by default when the spreadsheet was made or by the designer/creator in calculator preview mode.

Figure 11:
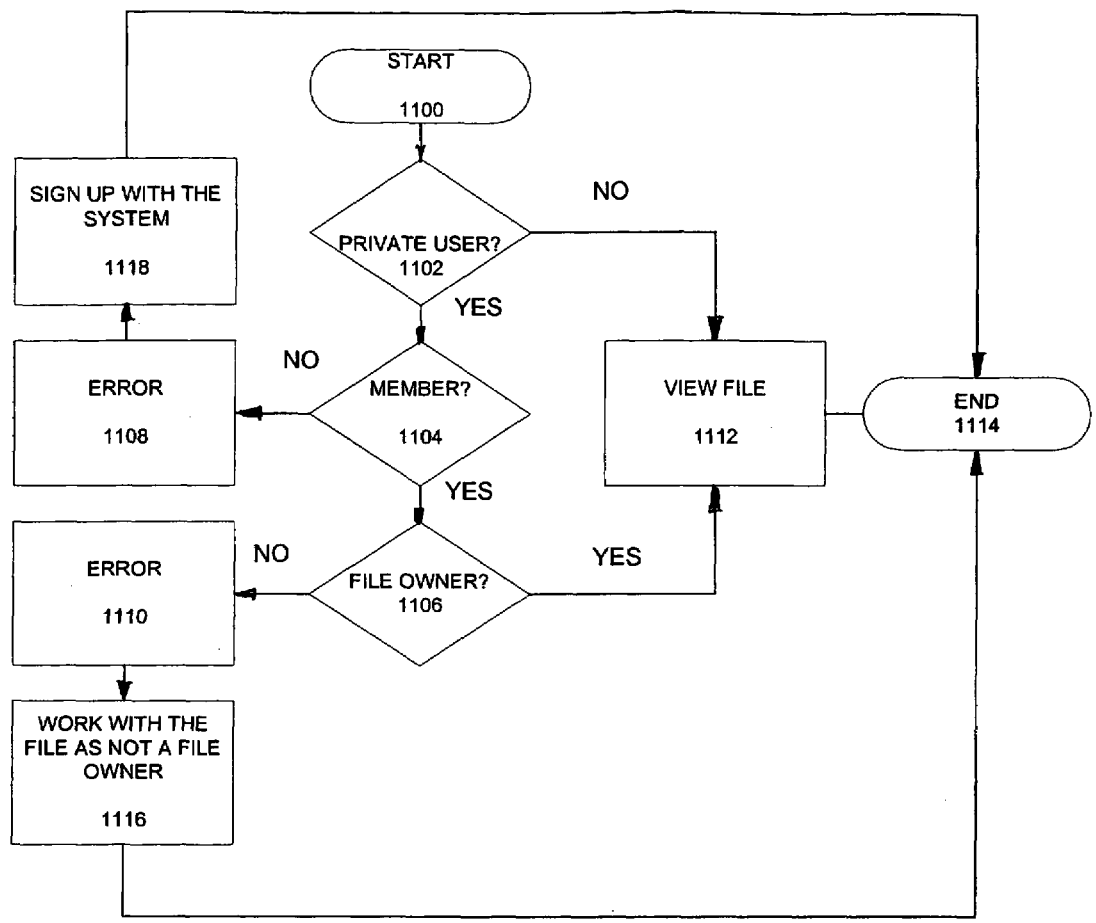
FIG. 11 is a flow chart showing a log in process in accordance with a described embodiment of the present invention.

FIG. 11 is a flow chart showing a log in process. The process starts in element 1100 and determines whether the user is a private user, in element 1102. The user has the option of making any individual file a "public" file, so that he can share it with others (see FIG. 10). A private user can only view private files if he has logged into the account where the file is listed. Alternatively, a public user has the URL of the file and wants to be able to view the file outside the private user's personal account. If the user is a private user, the process determines whether the user is a member, in element 1104. At this point, the user's name and password are posted to the server. The server 510 reviews the parameters and verifies that the user has an account with the system, i.e., the user is a member. If the user is not a member, the ERROR message is returned in element 1108, and the user is prompted to sign up with the system, in element 1118. In the alternative, if the user is a member, as determined from member file 512, the system determines, in element 1106, whether the user is the owner of the file he would like to work with. Every Spreadsheet/Calculator data file 516 contains a member ID. If the user ID matches the member ID in the Spreadsheet/Calculator data file 516, the user is the file owner. If the user is a file owner the system allows the user to view that file, in element 1112, and the process ends in 1114. Similarly, if the user is a public user a public user who has the URL of the file and wants to be able to view the file outside the private user's personal account, the system allows the public user to view that file, in element 1112.

If the member is not a file owner, the ERROR message is returned in element 1110 and the user is prompted to work with that particular file as not a file owner, in element 1116. If the user is a public user (he has the URL of the file and wants to be able to view the file outside the private user's personal account) he can view that file, in element 1112.

Figure 12:
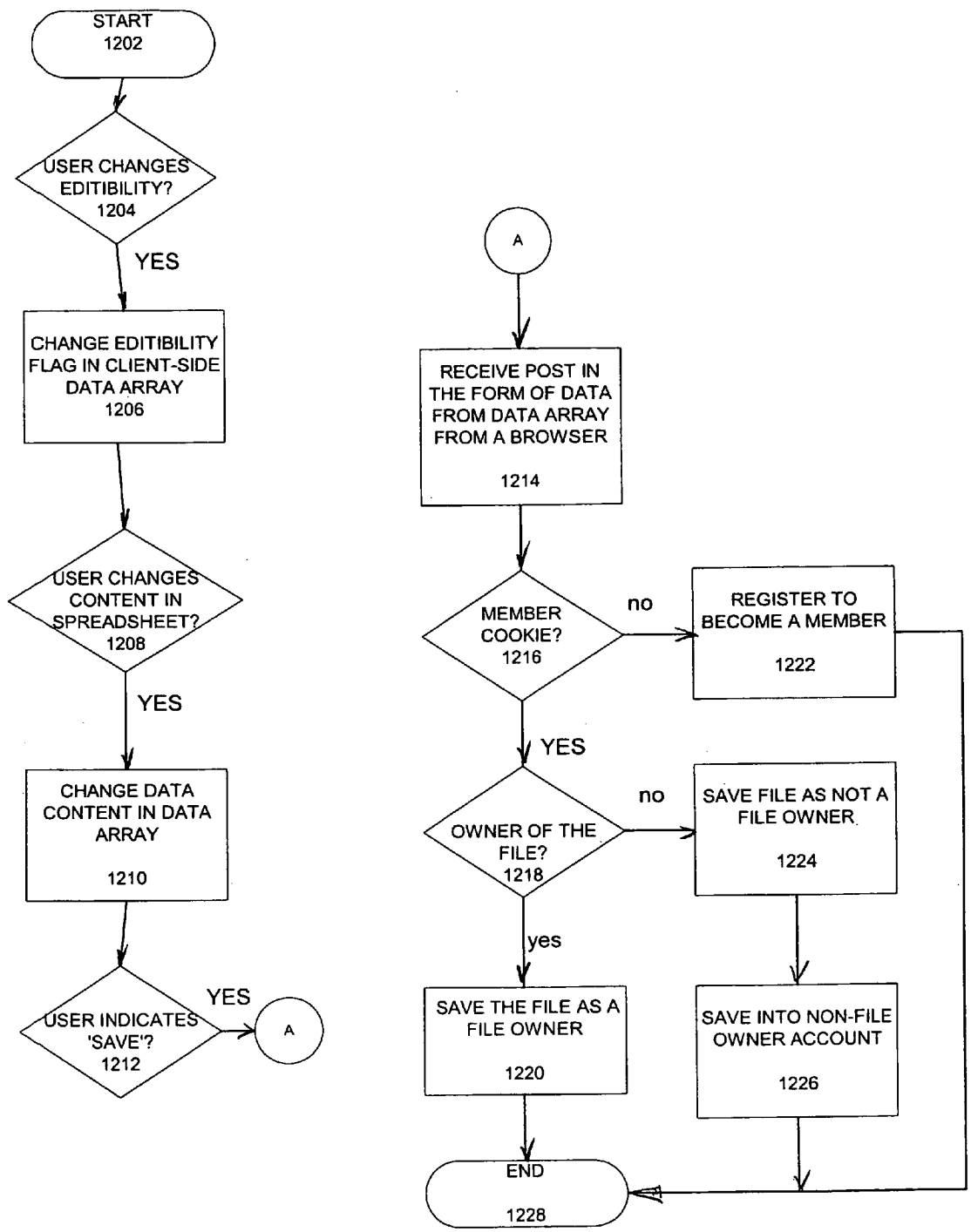
FIG. 12 is a flow chart showing a process of saving data to a server in accordance with a described embodiment of the present invention.

FIG. 12 is a flow chart showing a process of saving data into "My Files." The Save and Save As commands, which are accessed from the FILE menu, allow a calculator designer/creator to save the file he is currently working with. Save will overwrite the last saved version of the file, where Save As renames the current file and saves it (under a new name). The process starts in element 1202. In element 1204, the process determines whether calculator designer/creator changes editability. If the designer/creator changes editability, the editability flag is changed from "FALSE" to "TRUE" in client-side Data Array 502, in element 1206. If designer/creator changes cell's content in a spreadsheet, in element 1208, data content is changed in the Data Array 502, in element 1210. If the creator/designer indicates that he wants to save new data, in element 1212, the server 510 receives a "post" in the form of new data in client-side format, from a browser, in element 1214. In element 1216, the server determines whether the creator/designer is a member who has an account with the system in accordance with member file 512. If the user is a member, the process determines, in element 1218, whether the user is the owner of the file he is working with. In the alternative, if the user is not a member, in element 1222 the user is prompted to register and become a member. If the member is the owner of the file he is working with, the process offers the user to save the information in place of the original file, in element 1220. In the alternative, if the user is not the owner of the file, he is offered to save the file as not a file owner, in element 1224. The process then saves information about each cell, including all attributes, such as format, borders, editability, and cell dependency as well as rows height and columns width into non-owner account in element 1226. The process ends in element 1228.

Figure 13:
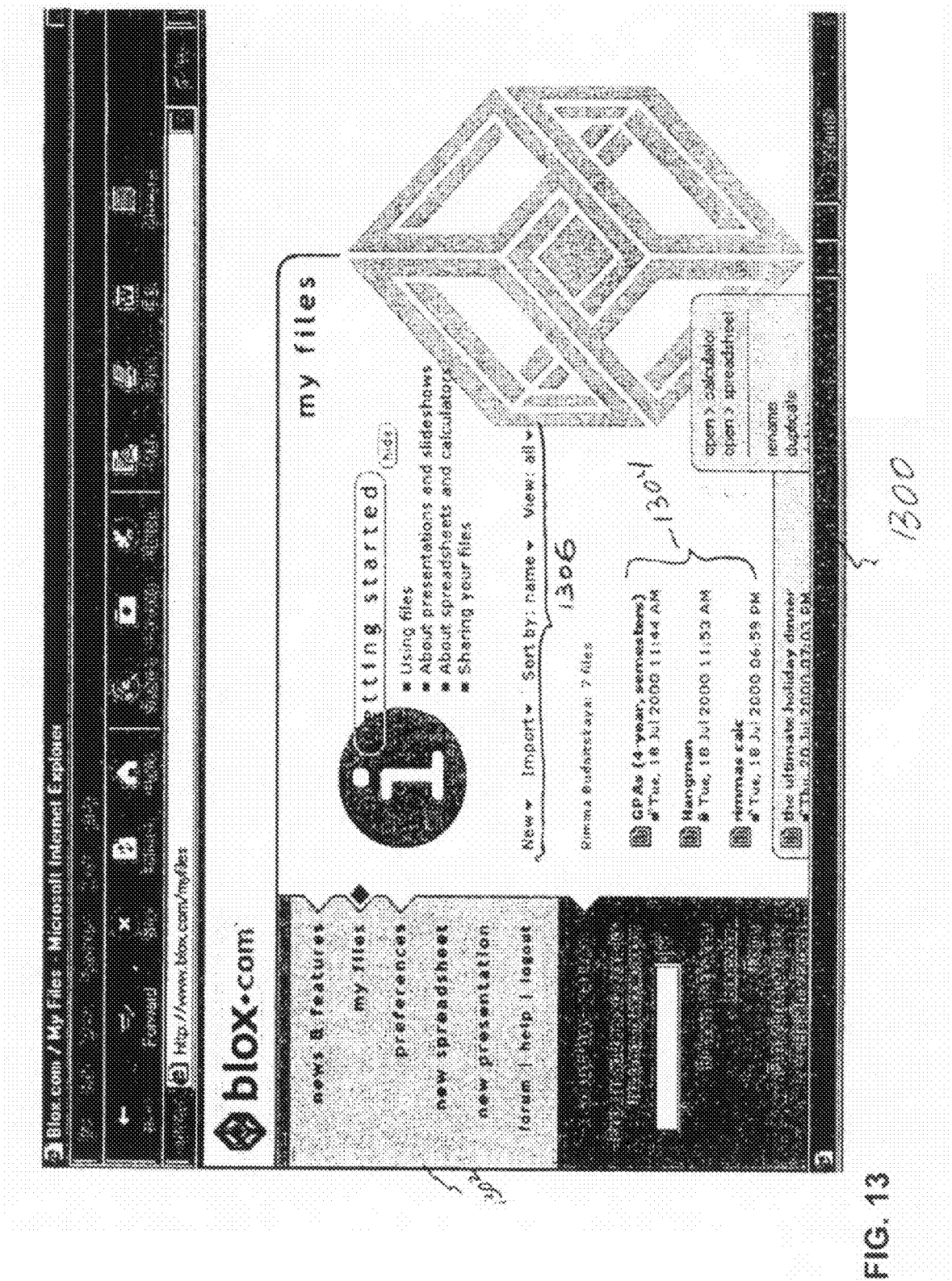
FIG. 13 pictorially illustrates a "My Files" page containing saved files in accordance with a described embodiment of the present invention.

FIG. 13 illustrates "My Files" page containing saved files. The "My Files" page 1300 is a user's personal file manager where each member accesses and manages his files. To access the files from the "My Files" page 1300, the user has to enter his name and password. The user has the option of making any individual file a "public" file, so that he can share it with others. The upper left panel 1302 of the page lets the user navigate between different major areas of the site. The middle area 1304 of the page displays user's list of files. The menu bar 1306 directly above the list of files allows the user to create new files, import files and images, sort the list of files, and view the files according to their type.

While the invention has been described in conjunction with a specific embodiment, it is evident that many alternatives, modifications and variations will be apparent to those skilled in the art in light of the foregoing description. Accordingly, the present invention is intended to embrace all such alternatives, modifications and variations as fall within the spirit and scope of the appended claims and equivalents.

What is claimed is:

1. A computer-implemented method performed by a client system for viewing a calculator web page, comprising:

sending a request from a client having a web browser, to view the calculator web page;

receiving, by the client, the requested calculator web page, wherein JavaScript Dynamic HyperText Markup Language (HTML) including functionality, format and content of the requested calculator web page is received;

displaying the requested calculator web page in the web browser in a calculator mode, wherein the web browser executes the JavaScript Dynamic HTML, the requested calculator web page comprising one or more editable cells and one or more non-editable cells, wherein the editable cells are displayed with a visually distinct indication from the non-editable cells via the JavaScript Dynamic HTML;

allowing, via the JavaScript Dynamic HTML being executed by the web browser, a user to change content in the editable cells and not allowing the user to change content in the non-editable cells in the displayed calculator web page in the web browser; and allowing, via the JavaScript Dynamic HTML of the calculator web page, the user to display the requested calculator web page in a calculator preview mode in which the user is allowed to edit the calculator web page as a web-based spreadsheet, wherein the web-based spreadsheet comprises JavaScript code that allows a user to change at least one of the non-editable cells to editable in response to clicking on the at least one of the editable cells without additional input, and to change at least one of the editable cells to non-editable in response to clicking on the at least one of the non-editable cells without additional input.

2. The method of claim 1, further comprising e-mailing a link to the calculator web page, including:

allowing the user to click on ."e-mail this page" button; and allowing the user to enter a recipient's address.

3. The method of claim 1, further comprising embedding the calculator in a web page, including:

allowing the user to indicate a calculator identifier (ID) of the calculator;

displaying an HTML code including the calculator ID of the calculator; and allowing the user to copy the HTML code and paste it into the web page's HTML.

4. The method of claim 3, wherein the web page includes "JavaScript include" tags.

5. The method of claim 1, wherein any cell depending on a value in another cell defaults to being non-editable in response to the web-based spreadsheet being initially displayed in a calculator preview mode, wherein any cell having a value that another cell depends on defaults to being editable in response to the web-based spreadsheet being initially displayed in the calculator preview mode.

6. A computer-implemented method performed by a server data processing system, comprising:

receiving a request, from a client system, for a calculator web page;

reviewing parameters received with the request for the calculator web page, the parameters including a calculator mode and a data ID; and sending the requested calculator web page, to the client system, based on the parameters received, wherein the calculator web page contains embedded data specific to the requested calculator web page and is capable of causing display of a calculator, wherein a script dynamic mark-up language includes functionality, format and content of the calculator web page, the script dynamic mark-up language being executable by the web browser, wherein the calculator web page comprises one or more editable cells and one or more non-editable cells, the script dynamic mark-up language of the calculator web page causing the editable cells to be displayed with a visually distinct indication from the non-editable cells, and wherein the script dynamic mark-up language of the requested calculator web page allows a user to display the requested calculator web page in a calculator preview mode in which the user is allowed to change content of at least one of the editable cells in response to clicking on the at least one of the editable cells without additional input, and does not allow a user to change content of at least one of the non-editable cells in a web browser in response to clicking on the at least one of the non-editable cells without additional input.

7. The method of claim 6, wherein before sending the calculator web page, JavaScript data is embedded into the calculator web page.

8. The method of claim 6, wherein the data ID identifies a file name.

9. A computer-implemented method for viewing a spreadsheet using a calculator preview mode on a computer system, comprising:

sending a request, from a designer/creator, to view a web-based spreadsheet in a spreadsheet mode, the web-based spreadsheet comprising a script;

displaying the spreadsheet in the spreadsheet mode in a web browser, wherein the web browser executes the script;

in response to a selection by the designer/creator to view the spreadsheet using the calculator preview mode in the web browser, the script of the web-based spreadsheet causing the display of the spreadsheet in the calculator preview mode in the web browser, wherein certain portions of the displayed spreadsheet are selected as non-editable such that the spreadsheet has one or more editable cells and one or more non-editable cells, the script of the web-based spreadsheet causing the editable cells being displayed with a visually distinct indication from the non-editable cells; and allowing, via the script of the web-based spreadsheet, the designer/creator to change at least one of the editable cells to non-editable in response to clicking on the at least one of the editable cells without additional input, and to change at least one of the non-editable cells to editable in the displayed spreadsheet in the calculator preview mode in the web browser in response to clicking on the at least one of the non-editable cells without additional input.

10. The method of claim 9, wherein the script of the web-based spreadsheet allows the designer/creator to select the calculator preview mode from a Tools menu.

11. A computer-implemented method for allowing a user to change contents of cells in a calculator in a calculator mode, the method comprising:

displaying a web-based spreadsheet in the web browser using a calculator preview mode, the spreadsheet having cells, at least one of the cells of the spreadsheet depending on a value in one or more other cells of the spreadsheet, wherein any cell depending on the value in another cell defaults to being non-editable in response to the web-based spreadsheet being initially displayed in the calculator preview mode, wherein any cell having a value that another cell depends on defaults to being editable in response to the web-based spreadsheet being initially displayed in the calculator preview mode, any editable cells being displayed with a distinct visual indication from the non-editable cells, the web-based spreadsheet comprising JavaScript code including functionality of the web-based spreadsheet, wherein the displaying comprises executing the JavaScript code by the web browser;

in response to the designer/creator clicking on the at least one of the editable cells in the calculator preview mode, the web browser by executing the JavaScript code changes the at least one of the editable cells to being non-editable without additional input;

in response to the designer/creator clicking on the at least one of the non-editable cells in the calculator preview mode, the web browser by executing the JavaScript code changes the at least one of the non-editable cells to being editable without additional input;

receiving, by a client system, a calculator based on the web-based spreadsheet in a calculator mode, the calculator comprising web-browser executable code including functionality, format and content of the calculator;

displaying the calculator in a web browser on a client system, wherein the web browser executes the web-browser executable code of the calculator that cause the cells to be displayed with a visual indication based on the editablity of the cells, such that any editable cells are displayed with the distinct visual indication from sa the non-editable cells; and allowing, by the web browser executing the web-browser executable code of the calculator on the client system, a user to change contents of the editable cells in the calculator, which is displayed in the web browser, in the calculator mode based on any changes to the cells' editability made in the calculator preview mode.

12. The method of claim 11, wherein the designer/creator is at the client, the client comprising a Data Array file of cell descriptions having values that are loadable from JavaScript of the web-based spreadsheet, further comprising:

in response to the designer/creator selecting to save the web-based spreadsheet, the client sends the cell descriptions to a server, the server writing the cells descriptions to a Spreadsheet/Calculator data file.

13. The method of claim 12, wherein the Data Array file comprises at least one flag value indicating editability of at least one cell, the flag value being changed in response to changing the editability of the cell, and the Spreadsheet/Calculator data file comprises at least one flag value indicating editability of at least one cell, the at least one flag value being changed in response to changing the editability of the cell.

14. The method of claim 13, wherein the flag in the Spreadsheet/Calculator Data file has a "FALSE" value for editable cells.

15. The method of claim 13, wherein the flag in the Spreadsheet/Calculator Data file has a "TRUE" value for non-editable cells.

16. The method of claim 11, wherein the cells containing text only default to being non-editable in the calculator preview mode.

17. The method of claim 11, wherein the JavaScript code is JavaScript Dynamic HyperText Markup Language (HTML).

18. The method of claim 11, wherein the visually distinguishing indication is an outline around the editable cells, and the non-editable cells do not have the outline.

19. A computer-implemented method for building a calculator on a client system, the method comprising:

receiving a calculator web page comprising a web-browser executable script to display a calculator;

determining, by executing the script in a web browser, a number of rows and columns for the calculator in accordance with data sent from a server;

initializing, by executing the script in the web browser, the content of each cell in the calculator in accordance with data sent from a server, the calculator comprising one or more editable cells and one or more non-editable cells;

building, by executing the script in the web browser, an input box for editable cells, wherein the input box visually distinguishes the editable cells from the non-editable cells;

making the cells visible once all the cells are built by executing the script in the web browser;

performing, by executing the script in the web browser, a formula calculation for cells having formulas in them;

allowing, by executing the script in the web browser, a user to enter contents in the editable cells, and not allowing the user to enter contents in non-editable cells; and allowing, via the script dynamic mark-up language of the calculator web page, the user to display the requested calculator web page in a calculator preview mode in which the user is allowed to edit the calculator web page as a web-based spreadsheet, wherein the web-based spreadsheet comprises script that allows a user to change at least one of the non-editable cells to editable in response to clicking on the at least one of the editable cells without additional input, and to change at least one of the editable cells to non-editable in response to clicking on the at least one of the non-editable cells without additional input.

20. The method of claim 19, wherein any cell depending on a value in another cell defaults to being non-editable when the web-based spreadsheet is initially displayed in a calculator preview mode, wherein any cell having a value that another cell depends on defaults to being editable when the web-based spreadsheet is initially displayed in the calculator preview mode.

21. The method of claim 19, wherein the initializing includes obtaining information about each particular cell from a Data Array file.

22. An article of manufacture comprising a computer readable medium embodying one or more instructions executable by a computer for performing a method of producing a web-based spreadsheet, the method comprising:

providing a web-based spreadsheet at a server, wherein the web-based spreadsheet has one or more editable cells and one or more non-editable cells, the web-based spreadsheet comprising a web-browser-executable script to allow a user to change at least one of the editable cells to non-editable in response to clicking on the at least one of the editable cells without additional input, and to change at least one of the non-editable cells to editable in a web browser in response to clicking on the at least one of the non-editable cells without additional input; and in response to a request from a client, sending the web-based spreadsheet to a client.

23. The article of manufacture of claim 22, wherein the script of the web-based spreadsheet, in response to being executed by a web browser at the client, causes the editable cells to be displayed with a visually distinct indication from the non-editable cells.

24. The article of manufacture of claim 22 wherein the web browser-executable script causes any cell depending on a value in another cell to default to being non-editable in response to the web-based spreadsheet being initially displayed in a calculator preview mode, and any cell having a value that another cell depends on to default to being editable in response to the web-based spreadsheet being initially displayed in the calculator preview mode.

25. An article of manufacture comprising a computer readable medium embodying one or more instructions executable by a computer for performing a method of producing a web-based spreadsheet, the method comprising:

providing a web-based spreadsheet at a server, wherein the web-based spreadsheet has one or more editable cells and one or more non-editable cells, the web-based spreadsheet comprising a web-browser-executable script such that any cell depending on a value in another cell defaults to being non-editable in response to the web-based spreadsheet being initially displayed in a calculator preview mode, and any cell having a value that another cell depends on defaults to being editable in response to the web-based spreadsheet being initially displayed in the calculator preview mode; and in response to a request from a client, sending the web-based spreadsheet to a client.

26. The article of manufacture of claim 25 wherein the script of the web-based spreadsheet allows a user to change at least one of the editable cells to non-editable in response to clicking on the at least one of the editable cells without additional input, and to change at least one of the non-editable cells to editable in a web browser in response to clicking on the at least one of the non-editable cells without additional input.

27. A computer-implemented method comprising:

providing a web-based spreadsheet, wherein the web-based spreadsheet has one or more editable cells and one or more non-editable cells, the web-based spreadsheet comprising a web-browser-executable script to allow a user to change at least one of the editable cells to non-editable in response to clicking on the at least one of the editable cells without additional input, and to change at least one of the non-editable cells to editable in a web browser in response to clicking on the at least one of the non-editable cells without additional input.

28. The method of claim 27 wherein the web-browser-executable script allows the user to change at least one of the editable cells to non-editable in response to clicking on the at least one of the editable cells without additional input in a calculator preview mode, and to change at least one of the non-editable cells to editable in a web browser in response to clicking on the at least one of the non-editable cells without additional input in the calculator preview mode.

29. The method of claim 27, wherein the web-browser-executable script causes any cell depending on a value in another cell to default to being non-editable, and any cell having a value that another cell depends on to default to being editable in response to the web-based spreadsheet being initially displayed in the calculator preview mode.

30. A computer-implemented method comprising:
providing a web-based spreadsheet, wherein the web-based spreadsheet has one or more editable cells and one or more non-editable cells, the web-based spreadsheet comprising a web-browser-executable script such that any cell depending on a value in another cell defaults to being non-editable in response to the web-based spreadsheet being initially displayed in a calculator preview mode, and any cell having a value that another cell depends on defaults to being editable in response to the web-based spreadsheet being initially displayed in the calculator preview mode.

31. The method of claim 30 wherein the script of the web-based spreadsheet allows a user to change at least one of the editable cells to non-editable in response to clicking on the at least one of the editable cells without additional input, and to change at least one of the non-editable cells to editable in a web browser in response to clicking on the at least one of the non-editable cells without additional input.

* * * * *